United States Patent [15] 3,649,216

Hammond et al. [45] Mar. 14, 1972

[54] CATHODE LUMINESCENT PHOSPHOR RECLAMATION

[72] Inventors: Michael J. Hammond; Raymond F. Herner, both of Towanda, Pa.

[73] Assignee: Sylvania Electric Products, Inc.

[22] Filed: May 28, 1970

[21] Appl. No.: 41,592

[52] U.S. Cl. ............................23/299, 23/305, 23/312 ME, 23/312 R, 23/18, 23/24, 23/134, 23/135, 252/301.4, 252/301.6, 209/5, 210/28, 210/37, 210/38
[51] Int. Cl. ..................B01d 21/01, B01d 9/00, C01f 17/00
[58] Field of Search ..............23/295, 299, 300, 305, 312 R, 23/312 ME, 15, 18, 19, 22, 23, 24, 134, 135; 252/301.4, 301.6; 209/167, 5, 10; 210/28, 38, 37

[56] References Cited

UNITED STATES PATENTS

| | | | |
|---|---|---|---|
| 3,348,924 | 10/1967 | Levine | 23/312 ME |
| 3,420,860 | 1/1969 | Ropp | 252/301.4 X |
| 3,437,432 | 4/1969 | Borchardt | 252/301.4 |
| 3,441,512 | 4/1969 | Durkee | 252/301.4 |
| 3,447,682 | 6/1969 | Hedler | 209/167 |
| 3,474,040 | 10/1969 | Hedler | 23/312 ME |
| 3,506,585 | 4/1970 | Otsuka | 23/300 X |
| 3,523,904 | 8/1970 | Single | 252/301.4 R |

*Primary Examiner*—Norman Yudkoff
*Assistant Examiner*—S. J. Emery
*Attorney*—Norman J. O'Malley, Donald R. Castle and William H. McNeill

[57] ABSTRACT

Cathode luminescent phosphors can be reclaimed from dilute solutions by adding to the solution controlled amounts of a soluble aluminum ion source, agitating the solution, separating the phosphor from the solution by conventional means, washing the phosphor, and finally drying the phosphor.

9 Claims, No Drawings

3,649,216

CATHODE LUMINESCENT PHOSPHOR RECLAMATION

BACKGROUND OF THE INVENTION

This invention pertains to cathodoluminescent phosphors and more particularly to a method for reclaiming cathodoluminescent phosphors from dilute solutions.

Color cathode-ray tubes, especially those adapted for color television applications, conventionally employ at least one electron gun and a related viewing panel having a cathodoluminescent screen responsive to electron impingement disposed upon a surface thereof. Such a screen is generally comprised of a plurality of discretely patterned cathodoluminescent phosphor groups consisting of bars, stripes, or dots of specific fluorescent material, which, in response to electron beam excitation, produce primary colors of green, blue, and red respectively.

In the art of manufacturing color cathode ray tubes, a cathodoluminescent screen of the above-described type can be fabricated by one of several well-known methods for applying color phosphors to the surface of the viewing panel. For example, one of these screening methods which has been found to be highly advantageous concerns a dry powder or dusting technique which is described in U.S. Pat. No. 3,025,161, "Method of Forming Pattern," by Thaddeus V. Rychlewski and assigned to the same assignee as the present invention. Briefly, dry powder screening involves the forming of a confined phosphor-laden atmosphere from which powdered phosphor particles are applied or settled onto a layer of moist photosensitive resist material disposed on the inner surface of the cathode-ray tube viewing panel. By discrete light exposure through a foraminous mask, positioned adjacent to the resist covered panel, multiple areas of phosphor are attached by light-activated cross-linking or enhanced polymerization of the photoresist material to form a photopatterned screen containing a multiplicity of discrete areas of the particular phosphor. (To simplify explanation, the term polymerization is used in this specification to define cross-linking of the polyvinyl alcohol chains). The phosphor particles applied to the resist material on the unexposed intervening areas of the screen are unattached since the photoresist associated therewith is unpolymerized. Thus, the phosphor and photoresist are easily and desirably removed by a subsequent developing operation which dissolves and rinses away the unexposed photoresist carrying with it the unadhered phosphor material and generally involves the use of copius amounts of water. This procedure is repeated for each color phosphor selectively disposed in the fabrication of the plural-color patterned screen.

Another conventional method for forming cathodoluminescent phosphor cathode-ray tube screens is by the wet or slurry method, wherein the phosphor being mixed with the photoresist material and surfactants is disposed as a liquid slurry coating in the panel. After exposure development, the wet disposed phosphor screen pattern is consummated in a manner similar to that utilized for the aforedescribed dry powder formed screens. The surplus phosphor is likewise removed by developing the exposed pattern of the slurry disposed screen.

In either case, only a fraction of each specific phosphor material applied in the initial screening operation, remains as an integral part of the finished screen. In general, the aforementioned excess phosphors which are removed as surplus material have been handled as waste material. Since certain of the phosphors, especially the rare earth varieties, are expensive materials, considerable monetary value is manifest in the loss of such phosphors. Therefore, it is most desirous to provide a nondestructive, essentially quantitative, inexpensive method for reclaiming the excess phosphors. However, the phosphor concentration in the water washing is usually less than about 5 percent. The residual surfactants and polymers create a very stable suspension at this low phosphor concentration. Standard techniques for removing solids from suspension are filtering, centrifuging or settling. But due to the high stability of the suspension settling is eliminated, filtering is difficult, time consuming, and uneconomical, and centrifuging is generally quite abrasive and can cause transition metal contamination, which generally degrades phosphor brightness.

It is believed, therefore, that a method which readily allows the cathodoluminescent phosphor to settle and allows rapid separation of the cathodoluminescent phosphor from the solution, and is nondestructive, essentially quantitative, and inexpensive, is an advancement in the art.

SUMMARY OF THE INVENTION

In accordance with one aspect of this invention, there is provided a method of reclaiming cathodoluminescent phosphor from a dilute solution. The method comprises adding, while agitating, a sufficient amount of a soluble aluminum ion source to the dilute solution containing the suspended cathodoluminescent phosphor to provide an aluminum ion concentration of at least about 50 milligrams aluminum per liter of solution. The pH of the solution is then adjusted to a range from about 6.5 to about 7.5 and the solution is agitated for at least about 5 minutes to produce a floc. The floc is separated from its mother liquor and washed with from about 1 to about 5 percent by weight aqueous solution containing a hydroxyl ion to remove the aluminum from the cathodoluminescent phosphor. The pH of the cathodoluminescent phosphor is subsequently adjusted to about 7, and the phosphor is dried for at least 2 hours at a temperature range from about 125° C. to about 200° C.

DESCRIPTION OF THE PREFERRED EMBODIMENTS

For a better understanding of the present invention, together with other and further objects, advantages, and capabilities thereof, reference is made to the following disclosure and appended claims in connection with the above description of one of the aspects of the invention.

The method for reclaiming the suspended cathodoluminescent phosphor from the dilute solution is to produce a floc whose zeta potential is close to zero and therefore will readily settle. As the floc settles, it entraps the phosphor particles, causing them to settle. After settling has occurred, the mother liquor is discarded, the floc is chemically removed, and the now concentrated phosphor suspension can be filtered, washed, and dried.

Referring now to the invention with greater particularity, there is a necessity to produce a floc that is easily removed and has no adverse effect on the particle size or brightness of the phosphor. Surprisingly it has been found that a soluble aluminum ion source added to the solution to provide a concentration of at least 50 mg. aluminum per liter of solution can be used to produce the aforementioned floc and later can be chemically removed from the phosphor, without any appreciable adverse effect on the particle size or brightness of the phosphor. By soluble aluminum ion source is meant one which is soluble in the solution media to the extent of at least about 0.1 g./100 cc. of solution; for example, in a solution comprising about 2% phosphor, less than about 1 percent polyvinyl alcohol and residual surfactants, and about 97 percent water. Preferred sources of a soluble aluminum ion source are aluminum sulfate, aluminum chloride, aluminum chlorate, aluminum iodide, aluminum acetate and aluminum nitrate. Of these, aluminum sulfate and aluminum chloride are especially preferred. Care should be taken to obtain a concentration of not less than about 50 mg. Al/liter of solution, nor greater than about 150 mg. Al/liter of solution. When less than about 50 mg. Al/liter of solution is used, the reclamation of the phosphor is generally not quantitative. Greater than about 150 mg. Al/liter of solution can result in lower brightness and can produce a stable gel and poor floc characteristics.

The pH of the aluminum ion containing solution is then adjusted to a range from about 6.5 to about 7.5, by the addition of a pH modifier. Since the pH of the above-mentioned solution will depend on both the phosphor and the aluminum ion source present, it is possible that in some cases an acidic pH modifier will be necessary and in other cases a basic pH modifier will be necessary. A mineral acid such as sulfuric or hydrochloric acid can be used or a basic solution such as ammonium hydroxide or sodium hydroxide can be used depending upon the adjustment required. If the pH of the solution varies from about 6.5 to about 7.5, the floc will not settle from the solution when the agitation is stopped. Generally, about 5 to about 30 minutes agitation is sufficient to produce the floc. Agitation is generally provided with conventional agitators used to provide agitation to solutions having the viscosity of about that of water. The degree of agitation need only to be sufficient to achieve good distribution of the components of the solution. The type of agitation and degree of agitation will be dependent upon the type of vessel used, availability of equipment and other factors that will be obvious to those familiar with chemical processing equipment design.

Once the floc is formed and agitation is ceased, the floc settles rapidly, entrapping the phosphor particle as it settled. The mother liquor can then be readily removed by conventional means such as decanting, filtering, etc. The floc can then be chemically removed; for example, by washing the phosphor entrained aluminum floc with about a 2 percent by weight sodium hydroxide solution treated to a temperature of at least about 60° C. The elevated temperature aids in the complete removal of the aluminum ions and enhances the settling characteristics of the phosphor particles. Although about a 2 percent, by weight, sodium hydroxide solution is especially preferred, any aqueous inorganic hydroxyl-ion containing solution from about 1 percent to about 5 percent, by weight, can be used. Other preferred sources include platinum hydroxide, lithium hydroxide, and ammonium hydroxide. Solutions below about 1 percent, by weight, are generally avoided as too dilute to effectively and economically remove the aluminum ions; and although solutions greater than about 5 percent, by weight, can be used, they are generally unnecessary and uneconomical.

The pH of the phosphor is then readjusted to about 7, usually by washing with water treated to a temperature of at least about 60° C. Temperatures of at least about 60° C. generally insure complete removal of the sodium ions. After removing the hot water wash, for example, by filtering, the phosphor is dried at a temperature range from about 125° C. to about 200° C. for at least about 2 hours. Within these limits, no deleterious effects on the phosphor will be had.

This method of cathodoluminescent phosphor reclaim from dilute slurries has been found to be effective for phosphors having an ion selected from the group consisting of oxides, sulfides, oxysulfides and vanadates, and having a cation selected from the group consisting of rare earths, zinc, and cadmium. Yttrium, for the purpose of this disclosure is to be considered a rare earth. Yttrium oxide, yttrium gadolinium oxide, gadolinium oxide, yttrium vanadate, and zinc cadmium sulfide host phosphors are particularly well suited for phosphor reclaim utilizing this invention.

To more fully illustrate the present invention, the following detailed examples are presented. All parts, portions and percentages are weight, unless otherwise given.

EXAMPLE 1

A slurry containing polyvinyl alcohol, water, a dichromate ion furnishing compound, and yttrium oxide host phosphor is prepared by techniques well known in the art. The initial phosphor concentration in the slurry is about 50 percent. The slurry is diluted to a concentration of about 2 percent phosphor with water. Aluminum sulfate $[Al_2(SO_4)_3 \cdot 18H_2O]$ is added to the diluted slurry until the aluminum concentration is about 70 mg. $Al^{+3}$/liter of slurry. The pH is then adjusted to a range of about 6.5 to 7.5 with sodium hydroxide and slowly agitated for a minimum of 5 minutes. After the floc settles, the mother liquor is decanted and the flocculated phosphor is washed twice with hot (60°–70° C.) 2% NaOH to remove the aluminum. The phosphor is then washed to neutral with hot deionized water, filtered, and dried. The resulting phosphor shows no brightness loss and the phosphor yield is essentially quantitative.

EXAMPLE 2

A dilute solution containing about 2 percent yttrium gadolinium oxide host phosphor, residual polyvinyl alcohol and surfactants is obtained. Aluminum chloride ($AlCl_3 \cdot 6H_2O$) is added to the dilute solution until the aluminum concentration is about 70 mg. $Al^{+3}$/liter of slurry. The pH of the solution is then adjusted to a range of about 6.5 to about 7.5 with hydrochloric acid and slowly agitated for a minimum of about 5 minutes. After the floc settles, the mother liquor is decanted and the phosphor entrained aluminum floc is washed with hot (60°–70° C.) 2 percent, by weight NaOH until the aluminum is removed. The phosphor is then washed to a pH of about 7 with hot deionized water, filtered, and dried. The resulting phosphor shows no brightness loss, and the phosphor yield is essentially quantitative.

Substantially the same results were obtained when dilute solutions containing yttrium vanadate, gadolinium oxide, and zinc cadmium sulfide host phosphors were used.

While there has been shown and described what are at present considered the preferred embodiments of the invention, it will be obvious to those skilled in the art that various changes and modifications may be made therein without departing from the scope of the invention as defined by the appended claims.

We claim:

1. A method for the nondestructive separation of cathodoluminescent phosphors, having an anion selected from the group consisting of oxides, oxysulfides, sulfides and vanadates, and a cation selected from the group consisting of rare earths, zinc and cadmium, from a dilute solution of at least one cathodoluminescent phosphor, polyvinyl alcohol, and water comprising the steps of:
    a. adding, while agitating, a soluble aluminum ion source to said dilute solution, to provide an aluminum ion concentration of at least about 50 mg. aluminum per liter of solution,
    b. adjusting the pH of said solution to a pH value from about 6.5 to about 7.5 by adding a pH modifier,
    c. agitating said solution for a minimum of 5 minutes to produce a floc,
    d. settling said floc and thereafter removing the resulting mother liquor,
    e. washing said floc to remove said aluminum ion source from said cathodoluminescent phosphor with an aqueous inorganic hydroxyl ion-containing solution having a concentration of from about 1 percent to about 5 percent by weight, heated to a temperature of at least about 60° C.,
    f. adjusting the pH of said cathodoluminescent phosphor to about 7, by washing with water heated to at least 60° C., and
    g. drying said cathodoluminescent phosphor for at least about 2 hours at a temperature range from about 125° C, to about 200° C.

2. A method according to claim 1, wherein said cathodoluminescent phosphor is yttrium oxide.

3. A method according to claim 1, wherein said cathodoluminescent phosphor is yttrium-gadolinium oxide.

4. A method according to claim 1, wherein said cathodoluminescent phosphor is zinc-cadmium sulfide.

5. A method according to claim 1 wherein said soluble aluminum source is selected from the group consisting of aluminum sulfate, aluminum chloride, aluminum nitrate, aluminum acetate, aluminum iodide, aluminum chlorate and aluminum bromate.

6. A method according to claim 5, wherein said soluble aluminum ion source is aluminum sulfate.

7. A method according to claim 6, wherein the concentration of said aluminum sulfate is from about 50 mg. aluminum per liter of slurry to about 150 mg. aluminum per liter of slurry.

8. A method according to claim 1, wherein said dilute solution contains less than about 5 percent cathodoluminescent phosphor.

9. A method according to claim 1, wherein said aqueous hydroxyl-ion containing solution is sodium hydroxide.

* * * * *